Feb. 27, 1968  H. MORTON  3,370,988
BATTERIES FOR MINER'S CAP LAMPS
Filed May 10, 1965  3 Sheets-Sheet 1
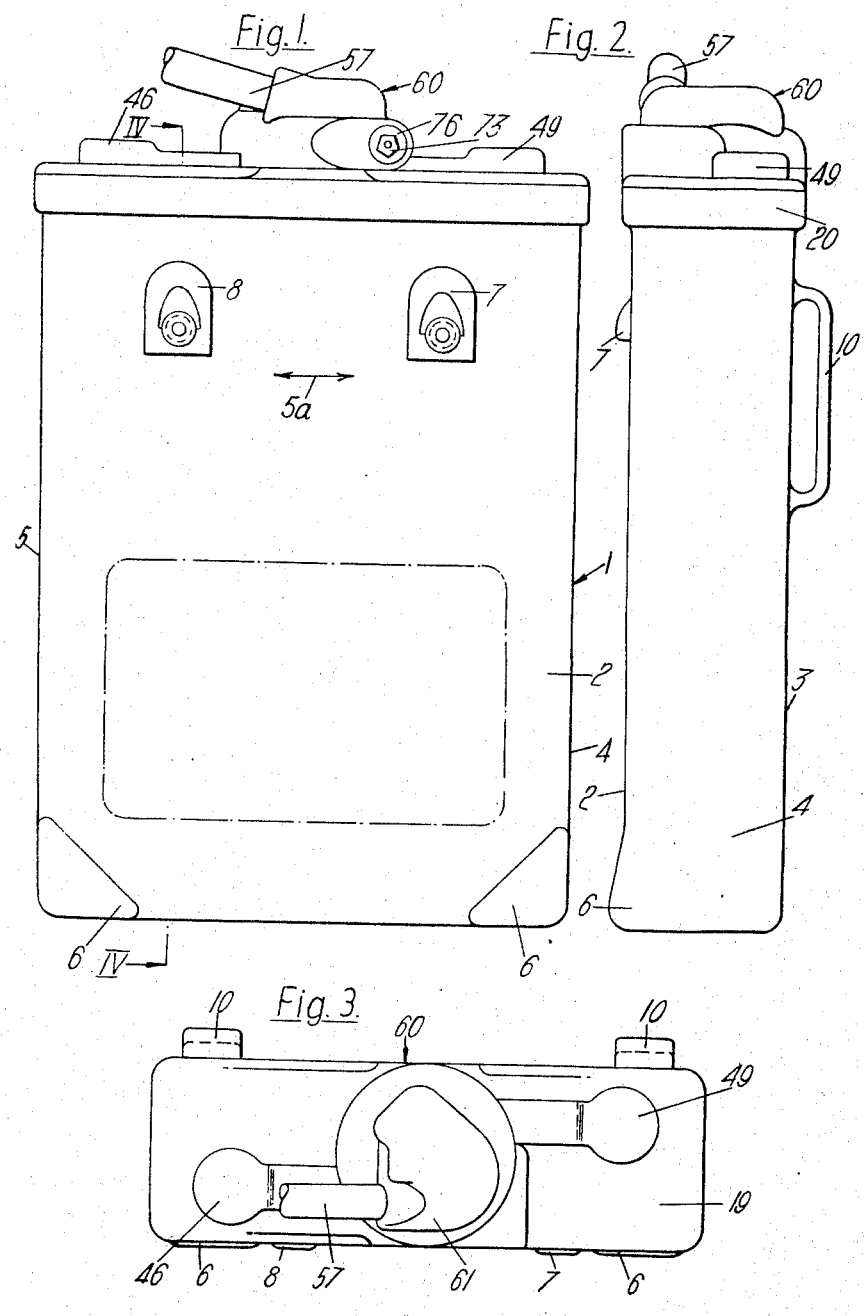
Inventor
HAROLD MORTON
By Imirie & Smiley
Attorneys

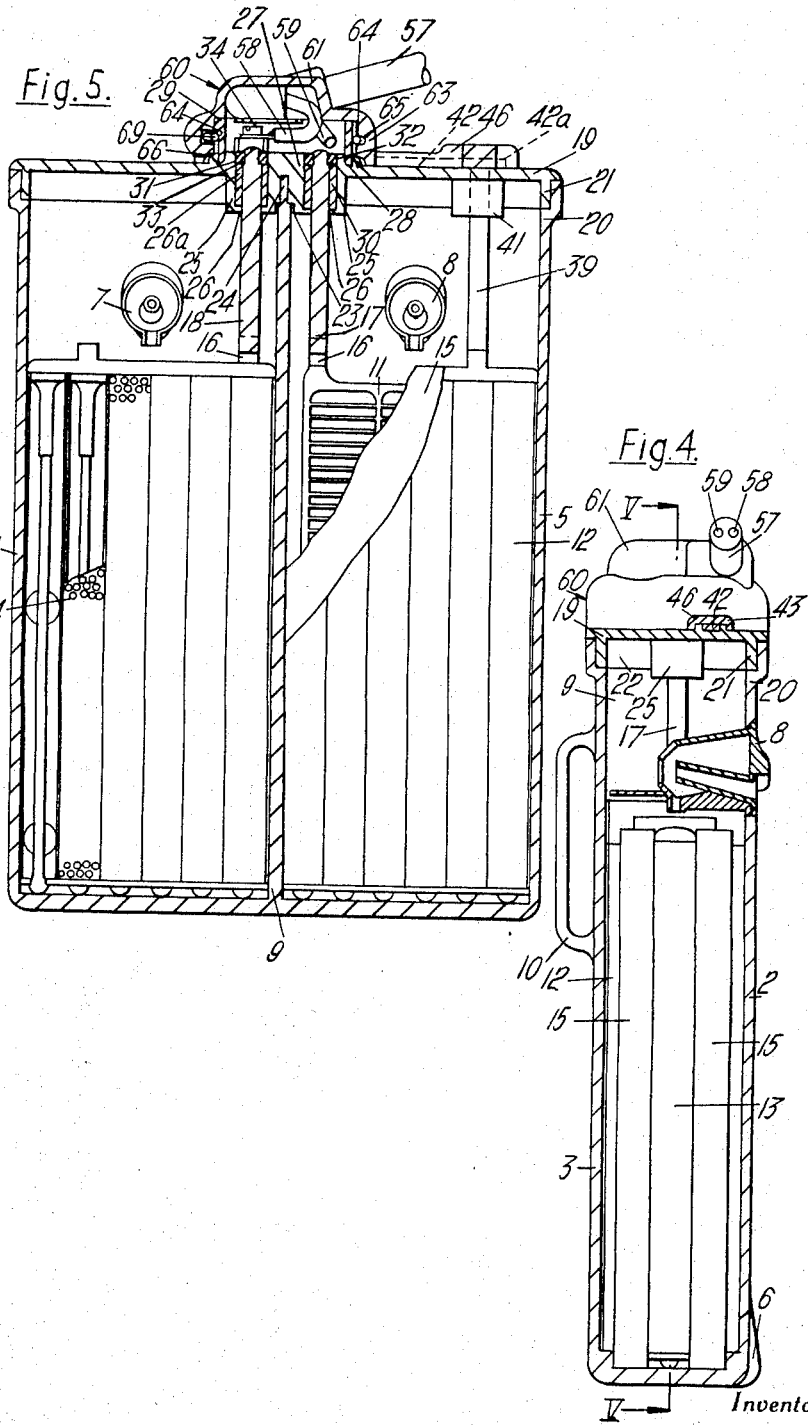

Feb. 27, 1968    H. MORTON    3,370,988
BATTERIES FOR MINER'S CAP LAMPS
Filed May 10, 1965    3 Sheets-Sheet 3
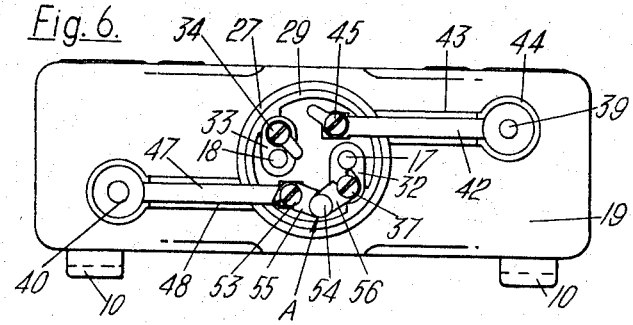
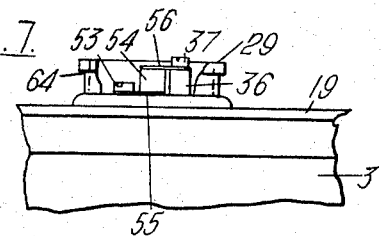
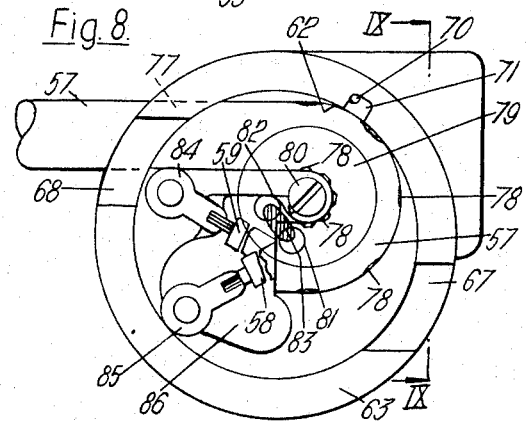
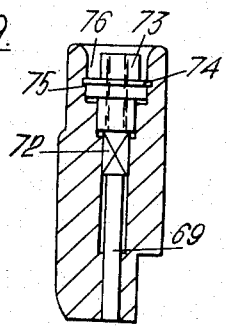
Inventor
HAROLD MORTON
By *Imrie & Smiley*
Attorneys United States Patent Office
3,370,988
Patented Feb. 27, 1968

3,370,988
BATTERIES FOR MINER'S CAP LAMPS
Harold Morton, Audenshaw, Manchester, England, assignor to Oldham & Son Limited, Manchester, England, a corporation of Great Britain
Filed May 10, 1965, Ser. No. 454,251
Claims priority, application Great Britain, May 22, 1964, 21,316/64
7 Claims. (Cl. 136—134)

ABSTRACT OF THE DISCLOSURE

A miner's cap lamp battery containing two secondary cells whose connection posts are connected to terminals in a central region of the sealed lid closing the cell, a removable cover being locked over the central region of the lid and the cable connecting the battery to a cap lamp being secured within the cover.

---

This invention relates to batteries for use with miner's cap lamps.

It is a main object of the present invention to provide an improved battery for use with a miner's cap lamp, which is of simple construction and is light in weight.

A further object of the present invention is to provide a cap lamp with an improved safety factor.

According to the invention there is provided a battery for use with a miner's cap lamp, comprising a battery casing containing two cells and closed by a lid, wherein the cells have upwardly extending connection posts which are electrically connected to terminals fixed to a central zone of the lid, and a removable cover is attached to the lid over that central zone which cover is shaped to lead a cable into the central zone for connection to the terminals.

In order that the connection posts may be electrically connected to the central terminals the outer connection posts may be of cranked formation so that they pass through the cell lid into the central zone along with the inner connection posts of the cells. In a preferred embodiment of the invention however the connection posts from the cells extend through the lid, connecting strips sealed in the lid are arranged to connect outer connnection posts to terminals fixed to a central zone of the lid, and a removable cover is provided for attachment to the lid over said central zone, which cover is shaped to lead a cabel into the central zone for connection to the terminals.

Desirably the battery casing is of flat, rectangular section and is divided by a central partition into two cell compartments, connection posts of like polarity (e.g. negative) of both cells extend through the central zone of the lid, the connection posts of opposite polarity (e.g. positive) of both cells extend through the lid near the outer ends of the lid, and the connecting strips extend in the lid from the outer connection posts into the central zone where they are connected to the terminals.

The cells may be arranged so that hte polarity of the connection posts is reversed. That is, the outer connection posts may be either both positive or both negative poles. In either case, the outer connection posts and the connecting strips, which are sealed in the lid and extend from the outer connection posts to the central zone of the battery lid, are at the same potential. If the top of the battery is damaged, for example by a metal object making contact with both the connecting strips, there is no danger of sparking. The cover over the central zone protects the terminals arranged in that zone from damage.

A fuse is incorporated in the battery and the two cells of the battery are connected in series by the fuse to give a 4-volt output. In the preferred construction, according to the invention, the battery further includes two output terminals fixed to the lid in said central zone, one output terminal being connected to the inner connection post of one of the cells and the other output terminal being connected to one end of the connecting strip of the other cell, and a fuse connecting the end of the connecting strip of said one cell to the inner connection post of the other cell, whereby the cells are connected in series through the fuse.

The connecting strips are sealed in the lid of the battery, the outer ends of the connecting strips are burned to the outer connection posts, the strips lie in channels formed in the upper surface of the lid, and the strips in the channels are enclosed by covers sealed over the channels in the lid. Alternatively the connecting strips may be moulded into the cell lid during the moulding of the lid.

Preferably, the central zone of the lid is delimited by a cylindrical wall upstanding from the surface of the lid, and the removable cover fits over and is locked to the cylindrical wall thereby enclosing all the terminals.

Desirably the inner surface of the cover is grooved and the outer surface of the cylindrical wall is formed with a shoulder co-operating with the groove, a flexible anchor cable is mounted in the groove in the cover and carries at one end an anchor pin which engages in a seating in the cover, and the other end of the cable is held by adjustable means mounted on the cover and operable to tighten the cable so that it grips the outer surface of the cylindrical wall under the shoulder and thereby locks the cover to the battery lid.

As well as providing protection for the terminals and fuse in the central zone of the battery lid, the removable cover is shaped to lead into the central zone the cable which connects the battery to a cap lamp. In order to lead the cable to the terminals and to secure the cable, the cover is formed with a groove for leading the cable into the cover, which cable passes tightly through a slanting hole in the top of the cover, there being projections around the cable groove to grip the cable in the groove.

The cable is so connected to the cap lamp that both the outer terminals of the battery are at the same potential as the bottom charging contact of the cap lamp, which contact is always alive. This is an additional safety factor which ensures that no short circuit can occur between the cap lamp and the connectors sealed in the battery lid.

The invention also comprehends a miner's cap lamp assembly, including a battery of the kind referred to above, electrically connected to a cap lamp by a cable held in the cover which is locked over the central zone of the battery lid.

In order that the invention may be more clearly understood an embodiment thereof will now be described, by way of example, with reference to the accompanying drawings in which:

FIGURE 1 is a front elevation of a miner's cap lamp battery according to the invention having a removable cover locked over the battery terminals located in a central zone of the battery lid, FIGURE 2 is a side elevation of the battery shown in FIGURE 1, FIGURE 3 is a plan view of the battery shown in FIGURES 1 and 2, FIGURE 4 is a section on line IV—IV of FIGURE 1, FIGURE 5 is a section on line V—V of FIGURE 4, FIGURE 6 is a plan view of the top of the battery lid with the electrical connections of the two cells of the battery exposed, FIGURE 7 is a side view of the top of the battery in the direction of the arrow 'A' marked on FIGURE 6, FIGURE 8 is an enlarged underneath view of the removable cover, and FIGURE 9 is a section on line IX—IX of FIGURE 8.

Referring to FIGURES 1 to 3 of the drawings, a twin-cell battery according to the invention for use with a miner's cap lamp comprises a battery casing 1 which is made of a tough transparent and acid-resistant plastic, for example a polycarbonate resin. The battery casing 1 is of flat rectangular section, having wide front and rear walls 2 and 3, and short side walls 4 and 5. The casing 1 is moulded from the plastic material as an integral construction which includes protective thickened corners 6 at the bottom of the front wall 2. Also, the front wall 2 is formed with arch-shaped holes and in which are fitted non-spill vent plugs 7 and 8 communicating with the two cells of the battery.

A central partition 9 is moulded in with the casing parallel with the side walls 4 and 5, as shown in FIGURES 4 and 5, and two belt loops 10 are moulded on the back wall 3. A belt strap around the miner's waist passes through the belt loops 10 and the thickened corners 6 at the front of the bottom of the battery give protection against accidental damage to the exposed bottom corners of the front wall.

The acid electrolyte in the battery is kept at the level indicated by the line 5a on the front wall of the battery casing, and because the casing is made of transparent plastic, the level of acid can be easily checked and topped up when necessary through the vent plugs 7 and 8.

As shown in FIGURES 4 and 5 each compartment of the battery casing contains a secondary cell of conventional kind comprising two negative plates 11 and 12, one positive plate 13, which is made up of tubular elements of active battery material surrounded by perforated tubular sleeves 14. There are separators 15 between the positive and negative plates of the battery.

The negative plates 11 and 12 of each battery are connected together by a connection bar 16, from each of which bars 16 a connection post, respectively 17 and 18, extends upwardly and through the lid 19 which closes the top of the battery casing. The battery casing is widened at the top to form a shoulder 20 in which a flange 21, extending from the bottom of the lid 19, is seated. The flange 21 is sealed into the shoulder 20 with an adhesive which is resistant to attack by the battery electrolyte.

The two negative connection posts 17 and 18 extend through a central zone of the lid and are held in a central thick rib 22 which extends across the centre of the lid. There is a central slot 23 in this rib 22 in which the top edge 24 of the partition 9 is sealed by means of an adhesive so that the two cells are isolated from each other.

The hollow bosses 25 are moulded centrally on the underside of the lid, the holes 26 at the bottom of the bosses 25 being just large enough to accept the two negative connection posts 17 and 18. When the posts are assembled through the bosses, they are fixed by acid-resistant cement 26a which fills the bosses.

The top surface of the lid is formed with a central circular boss 27 which carries all the terminals of the battery. There is an annular groove 28 in the top of the boss 27 and the bottom edge of a cylindrical wall 29 is seated in the groove 28, being held by an adhesive. This cylindrical wall 29 delimits the central zone of the lid and is upstanding from the top surface of the lid. The connection posts 17 and 18 extend upwardly through the top surface of the boss 27 and as shown in FIGURES 5 and 6, are disposed along the centre line of the lid.

The top of each post 17 and 18 is located in a recess, respectively 30 and 31, in the boss 27 for receiving a lead connector, respectively 32 and 33, which connectors are welded to the connection posts 17 and 18. The connector 33 carries a screw terminal 34 which is the negative output terminal of the battery, and the connector 32 is extended upwardly at one end as shown at 36 in FIGURE 7 and carries a screw terminal 37 at the top of the extension.

The positive plate 13 of each of the cells is connected to a positive connection post, respectively 39 and 40, which are offset on either side of the centre line of the battery and extend upwardly through hollow bosses 41 moulded on the underside of the lid and constructed in the same way as the bosses 25.

As shown in FIGURE 6, these two outer connection posts 39 and 40 are connected to the terminals arranged in the central zone of the lid by connecting strips which are sealed in the lid. A connecting strip 42 is located in a channel 43 formed along the upper surface of the lid, and ends in a shoe 42a of circular form which is contained within a circular end 44 to the channel 43 and is burned to the top of the post 39 which protrudes through the lid surface. The strip 42 passes through a channel cut in the boss 27 and the bottom of the wall 29, and a screw terminal 45 is fixed to the inner end of the strip 42 within the central zone. This screw terminal 45 forms the positive output terminal of the battery.

The strip 42 is sealed into the channel 43 by a cover 46 shaped to engage over the channel 43 and its circular end 44, and the cover 46 extends up to the outer surface of the wall 29. An adhesive is used to stick the cover on to the channel so that the strip 42 is sealed in the lid.

In the same way the positive terminal post 40 of the other cell has a shoe 47a of a connecting strip 47 burned to it, which strip is seated in a channel 48 and is sealed in that channel by a cover 49 fitted over the channel and the connecting strip. The connecting strip 47 extends through the boss 27 and under the wall 29 into the central zone of the lid where it has a screw terminal 53 attached to it.

The connecting strips may be copper strips 42 and 47 each having a lead shoe, respectively 42a and 47a, cast on to the outer end of the strip. Alternatively the connecting strips may be tinned brass strips which are burned directly to the tops of the posts 39 and 40. The two cells of the battery are connected in series by connecting together the terminals 53 and 37 with a fuse 54 of any suitable kind which has lugs 55 and 56 mounted at an angle as shown in FIGURE 6 to match the position of the terminals. The lug 55 hooks on to the terminal 53 and the lug 56 at the top of the fuse hooks on to the raised terminal 32. Thus the positive connection post 40 is connected to the negative connection post 32 of the other cell through the fuse 56 and the voltage between the output terminals 34 and 45 is 4 volts.

The battery is connected to a cap lamp through a two-way cable 57 carrying two wires 58, 59 connected to the output terminals 34 and 45, and the cable 57 is led into the central zone of the battery lid through a specially shaped, removable cover indicated generally by the reference 60. The removable cover 60 fits over and is locked to the cylindrical wall 29, so that all the central zone of the lid is enclosed by this removable cover 60. The cover 60 has a specially shaped top 61 which defines a cable groove 62 which will be described below with reference to FIGURE 8.

The lower part of the cover 60 is formed as a cylindrical wall 63, whose inner surface is of slightly greater diameter than the outer surface of the cylindrical wall 29 so that the cover 60 fits snugly over the wall 29. The lower part of the outer surface of the wall 29 is recessed to form a shoulder 64, FIGURE 5, and the inner surface of the wall 63 of the cover is grooved as indicated at 65. The groove 65 lies opposite the shoulders 64 when the cover is seated down over the central zone of the lid. The foot of the inner surface of the cover is cut away as shown at 66 to allow the cover to seat down on to the top surface of the battery lid, and as shown in FIGURE 8, channels 67 and 68, are cut through the bottom of the wall 63 of the cover to allow the cover to be seated over the covers 46 and 49 which are sealed over the connecting strips 42 and 47.

A flexible anchor cable 69, which is preferably a multi-strand cable with a plastic covering, for example polyethylene, is mounted in the groove 65 in the cover and the cable 69 carries at one end an anchor pin 70, FIGURE 8, which engages in a slot 71 cut into the inner wall of the cover.

As shown in FIGURE 9, the other end of the cable 69 is fixed to a threaded rod 72 which is screwed through a locking nut 73 having a flange 74 which bears against an abutment face 75 formed in a hole 76 in the side 63 of the cover (see also FIGURE 1). The locking nut 73 is a special five-sided nut and can only be turned with a special key, thereby greatly reducing the risk of the battery being tampered with underground to expose the electrical connections of the battery. In an alternative construction the locking nut 73 does not carry a flange 74 but a circlip is provided in place of the flange.

When the nut 73 is turned, the rod 72 is drawn into the nut and the anchoring pin 70 is drawn against one end of the slot 71. The cable 69 is tightened under the shoulder 64 of the wall 29 as shown in FIGURE 5, but the cable still bears against the edges of the groove 65 in the inner surface of the cover, and when the cable is tight under the shoulder 64 the cover 60 is locked on to the top of the battery lid. If the cover has to be unlocked and removed for servicing the battery or replacing the fuse, then it is a simple operation merely requiring the cable 69 to be slackened by means of the special key and all the electrical connections of the battery are immediately exposed when the cover is removed.

Referring to FIGURE 8, the cable groove 62, formed in the cover 60, leads from a slanting hole 77 in the top of the cover. The cable 57 is a tight fit in the hole 77 and is held tightly in the groove 62 by sharp projections 78 formed around the cable groove, which projections grip the outer sleeve of the cable. The cable is also held by a washer 79 which is pressed against the cable by a screw 80. A cord passes throughout the length of the cable in well known manner. One end of the cord is anchored to the cap lamp headpiece connected to the battery and the other end of the cord indicated at 83 is anchored to the battery by being threaded through two holes 81 and 82 in the washer 79 and tied. Any strain between the battery and the headpiece is carried by the cord and not by the two wires 58 and 59 of the cable.

The two wires 58 and 59 of the cable are provided with connection tags 84 and 85 which are fixed to the output terminals 34 and 35. There is a depression 86 in the top of the cover to receive the raised fuse 56 and terminal 37, and the cover 60 is otherwise a solid moulded construction so that it protects the central zone of the battery lid containing the terminals.

All the electrical connectors of opposite polarity are enclosed under the cover 60 and the connecting strips which extend out from the central zone to the outer connection posts 39 and 40 are of the same polarity, so that even if the protective covers 48 and 49 are damaged, any electrical connection made between the strips 42 and 47 cannot produce a dangerous spark or heating since these two strips are at the same potential.

In an alternative construction according to the invention the outer connection posts 39 and 40 are cranked so that they extend through the battery lid within the central zone of the lid, and connection strips are not employed in the lid.

The invention thus provides a light and simplified battery construction for use with a miner's cap lamp, which battery is electrically safe and practically tamper-proof, and which can be easily serviced by removal of the cap 60 using a special key to release the locking cable and by topping up through the vent plugs 7 and 8, the acid level being visible through the transparent battery casing.

What is claimed is:

1. A battery for use with a miner's cap lamp, comprising a battery casing containing two secondary cells and closed by a lid sealed to the casing, through which lid connection posts extend from the cells, connecting strips enclosed within the substance of the lid and arranged to connect outer connection posts of the cells to terminals fixed to a central zone of the lid, a removable cover attached to the lid over said central zone, which cover is shaped with an internal cable groove adapted to lead a cable into the central zone for connection to the terminals, means within the cover for securing the cable to the cover, and locking means in the cover for locking the cover to the lid around the whole periphery of the cover.

2. A battery according to claim 1, wherein the internal cable groove is a slanting hole in the top of the cover, there being projections around the wall of the cable groove to grip the cable in the groove.

3. A battery according to claim 1, wherein the battery casing is of flat, rectangular section and is divided by a central partition into two cell compartments, connection posts of like polarity (e.g. negative) of both cells extend through the central zone of the lid, the connection posts of opposite polarity (e.g. positive) of both cells extend through the lid near the outer ends of the lid, and the connecting strips extend in the lid from the outer connection posts into the central zone where they are connected to the terminals.

4. A battery according to claim 3, including two output terminals fixed to the lid in said central zone, one output terminal being connected to the inner connection post of one of the cells and the other output terminal being connected to one end of the connecting strip of the other cell, and a fuse connecting the end of the connecting strip of said one cell to the inner connection post of the other cell, whereby the cells are connected in series through the fuse.

5. A battery according to claim 3, wherein the outer ends of the connecting strips are burned to the outer connection posts, the strips lie in channels formed in the upper surface of the lid, and the strips in the channels are enclosed by covers sealed over the channels in the lid.

6. A battery according to claim 1, wherein the central zone of the lid is delineated by a cylindrical wall upstanding from the surface of the lid, and the removable cover fits over and is locked to the cylindrical wall around its whole periphery thereby enclosing all the terminals.

7. A battery according to claim 6, wherein the inner surface of the cover is grooved and the outer surface of the cylindrical wall is formed with a shoulder co-operating with the groove, a flexible anchor cable is mounted in the groove in the cover and carries at one end an anchor pin which engages in a seating in the cover, and the other end of the cable is held by adjustable means mounted on the cover and operable to tighten the cable so that it grips the outer surface of the cylindrical wall under the shoulder and thereby locks the cover to the battery lid.

References Cited

UNITED STATES PATENTS

| 1,266,814 | 5/1918 | Kammerhoff | 136—135 |
| 1,321,960 | 11/1919 | Wheat | 136—181 |
| 2,194,885 | 3/1940 | Critchfield et al. | 136—134 |

FOREIGN PATENTS

| 104,931 | 8/1938 | Australia. |
| 513,213 | 8/1952 | Belgium. |

ALLEN B. CURTIS, *Primary Examiner.*

WINSTON A. DOUGLAS, *Examiner.*

D. L. WALTON, *Assistant Examiner.*

UNITED STATES PATENT OFFICE
CERTIFICATE OF CORRECTION

Patent No. 3,370,988                  February 27, 1968

Harold Morton

It is certified that error appears in the above identified patent and that said Letters Patent are hereby corrected as shown below:

In the heading to the printed specification, line 8, for "21,316/64" read -- 21,314/64 --.

Signed and sealed this 15th day of July 1969.

(SEAL)
Attest:

Edward M. Fletcher, Jr.                WILLIAM E. SCHUYLER, JR.
Attesting Officer                       Commissioner of Patents